United States Patent [19]

Madden

[11] E Patent Number: Re. 33,163

[45] Reissued Date of Patent: Feb. 13, 1990

[54] GAS EQUALIZER FOR DOWNHOLE PUMP

[75] Inventor: Raymond D. Madden, Odessa, Tex.

[73] Assignee: Madden Sales & Service, Inc., Odessa, Tex.

[21] Appl. No.: 322,350

[22] Filed: Mar. 10, 1989

Related U.S. Patent Documents

Reissue of:

[64] Patent No.: 4,781,547
Issued: Nov. 1, 1988
Appl. No.: 30,586
Filed: Nov. 13, 1986

[51] Int. Cl.[4] ..... F04B 7/00; F04B 21/04

[52] U.S. Cl. ..... 417/444; 417/514; 417/554

[58] Field of Search ..... 417/435, 443, 444, 445, 417/446, 447, 511, 514, 554

[56] References Cited

U.S. PATENT DOCUMENTS

| | | | |
|---|---|---|---|
| 48,080 | 6/1865 | Old | 417/447 |
| 1,685,650 | 9/1928 | Streich | 417/443 |
| 2,131,299 | 9/1938 | Reagin | 417/444 X |
| 2,344,786 | 3/1944 | Patterson et al. | 417/443 X |
| 2,690,134 | 9/1954 | Ritchey | 417/443 |
| 3,055,764 | 9/1962 | Pryor et al. | 417/444 X |
| 3,139,039 | 6/1964 | Adams | 417/511 |
| 4,087,212 | 5/1978 | Holder | 417/444 |
| 4,599,054 | 7/1986 | Spears | 417/511 |

FOREIGN PATENT DOCUMENTS

| | | | |
|---|---|---|---|
| 545389 | 3/1932 | Fed. Rep. of Germany | 417/514 |

*Primary Examiner*—Leonard E. Smith
*Attorney, Agent, or Firm*—Warren B. Kice

[57] ABSTRACT

A gas equalizer device for use in conjunction with a reciprocatory pump located downhole in a wellbore. The device of the present invention avoids a condition commonly known in the pumpjack art as "fluid pounding", which is brought about when compressible gases accumulate in the working chamber of the downhole pump. The gas equalizer device of the invention includes a pushrod having a marginal end reciprocatingly enclosed in a slidable manner within a housing which is mounted to the usual traveling valve cage of the downhole pump. The pushrod is alternately moved from an extended into a retracted position each upstroke and downstroke of the pump. The free terminal end of the pushrod is arranged to engage the ball check valve of the traveling valve assembly as the pump commences the downstroke. This unseats the ball, thereby allowing any accumulated gases to escape from the variable pump chamber. This action allows the escaped gases to flow out of the pump and up the tubing string along with the produced fluid and thereby avoids the undesirable gas locking that otherwise may occur.

29 Claims, 2 Drawing Sheets

GAS EQUALIZER FOR DOWNHOLE PUMP

Matter enclosed in heavy brackets [ ] appears in the original patent but forms no part of this reissue specification; matter printed in italics indicates the additions made by reissue.

BACKGROUND OF THE INVENTION

The production of crude oil often requires the use of artificial lift means by which the crude oil is lifted from the bottom of the borehole to the surface of the ground. Downhole pumps of the reciprocatory type used downhole in a wellbore for lifting crude oil from the bottom of the well thousands of feet to the surface of the ground have been employed in the oil field for many years. These downhole pumps are manufactured by a large number of different firms and therefore the pumps take on a number of different forms.

The produced fluid being lifted from the production zone always has some compressible fluid, such as natural gas, solubilized therein. As the formation fluid migrates from the payzone, through the casing perforations, and into the pump intake, separation between the gaseous and liquid phase of the formation fluid often occurs. Sometimes the separation is negligible and can therefore be ignored, or at least tolerated; however, the separation of the gas and liquid in most wells is considerable and brings about a condition recognized in the oil field production art as "gas locking". Gas locking is more likely to occur as the fluid level at the bottom of the borehole is lowered due to the pumping action. This aspect of downhole pumping, or artificial lift devices, and its deleterious effect upon downhole equipment has been studied at great length.

Most downhole pumps used in conjunction with pumpjack units have a plunger attached to be reciprocated by a rod string. The plunger has a check valve assembly, called a traveling valve assembly, therein which controls the flow of formation fluid through the plunger on the downstroke, and which closes to enable the plunger to lift the fluid on the upstroke.

Other downhole pumps used in conjunction with pumpjack units have a barrel attached to the sucker rod string while the plunger remains stationary respective to the borehole. In this event, the reciprocating barrel, has a traveling valve assembly associated therewith which controls the flow of formation fluid through the barrel.

In either event, it is advantageous to insure the ball of the traveling valve assembly is lifted from its seat as the pump nears the end of the downstroke, thereby expelling any compressible fluids from the pump variable chamber and obviating gas locking. This should not be confused with "fluid pounding" which results from a pumped off condition, because nothing other than increased flow from the production formation can avoid pumping off a wellbore.

The patents to Simon U.S. Pat. No. 4,219,311; Ritchey U.S. Pat. No. 2,690,134; Patterson et al U.S. Pat. Nos. 2,344,786 and 2,344,787; Hall U.S. Pat. No. 2,132,161; Streich U.S. No. 1,685,650; Knotts et al U.S. Pat. No. 1,498,042; and Farrah U.S. Pat. No. 984,084 represent the pertinent prior art.

Ritchey '134 discloses a downhole pump having a traveling valve element 44 which is upset from its seat by a finger 36. Note cage 30 attached to fixed plunger assembly 12, 20, 24, 26.

Hall '161 shows rod 11 guided at 10 and interposed between balls 6 and 13. Hence, the rod 11 is spring loaded by the lower ball spring 5.

Knotts et al '042 discloses a finger movable against upper ball 7. Note the spring in FIG. 2 which biases the finger downhole.

Patterson et al '786 and '787 shows a downhole pump having a plunger 46 which is spring loaded and upsets upper ball 37.

None of the above patents show a pushrod attached to the traveling valve of a downhole pump and means for moving the push-rod towards the ball valve during the downstroke so that the ball is moved a limited amount that cannot cause damage to the ball cage and which exhausts compressible gases from the pump working chamber.

The various different solutions provided by the above prior art references are deemed unsatisfactory, either because of their great complexity and expense, or because of the inherent damage that can potentially result as a consequence of the mechanism not being properly adjusted as contemplated by the inventor. The employment of apparatus thousands of feet downhole in a borehole cannot be directly monitored and controlled once the apparatus is operating out of sight and accordingly, it would be desirable to have made available improvements in apparatus for preventing gas lock in downhole pumps which avoid damage to the valve cage of the pump in the event the apparatus and downhole pump are not precisely adjusted to the optimum that may be desired.

SUMMARY OF THE INVENTION

This invention sets forth improvements in a gas relief device for avoiding gas lock in a reciprocatory downhole pump. The apparatus of the present invention is prefewrably used in combination with a downhole production pump which is actuated by a string of sucker rods connected to a pumpjack unit. The gas relief device of the present invention is particularly useful in combination with a downhole pump having a traveling valve and a fixed valve.

Broadly, the present invention comprises a device adapted to be fitted to an ordinary downhole pump of the reciprocatory type, that unseats the traveling ball check valve during most of the downstroke. The device achieves this desirable result in response to inertia, pressure differential of the produced fluid flow, and friction between coating parts of the pump and the device.

In particular, the novel gas relief device is positioned within the downhole pump at a location adjacent the traveling valve, and includes a piston member which is arranged to move a pushrod into contact with and thereby unseat the traveling valve element from the traveling valve seats as the pump reciprocates on the downstroke. The piston member moves the pushrod free of the ball check valve during the upstroke.

The relief device is positioned with the longitudinal axial centerline thereof arranged to coincide with the longitudinal axial centerline of the pump barrel and plunger. The device includes a cylindrical housing mounted in fixed relationship respective to the traveling valve of the pump. The housing is axially aligned with the well tubing, with there being a piston having one marginal end portion reciprocatingly received within the housing. One end of the pushrod is connected to be moved by the piston so that a free end portion extends uphole where it can be brought into contact with the ball of the traveling valve assembly.

An adaptor sub formed at the upper end of the housing provides a mounting means by which the device of the present invention can be mounted and used in conjunction with a traveling plunger-type pump or a traveling barrel-type pump.

Accordingly, a primary object of the present invention is the provision of a gas relief device positioned within a downhole pump and arranged to remove compressible fluid from the variable pump chamber each downstroke of the pump.

Another object of the present invention is the provision of apparatus for attachment to the valve cage of a downhole reciprocatory production pump which opens the traveling valve each downstroke of the pump.

A still further object of the present invention is the provision of a gas relief device mounted in fixed relationship respective to a traveling valve cage of a downhole production pump, wherein the device is brought into contact with and lifts the ball of the traveling valve assembly from its seat in response to inertia, fluid flow, and friction each downstroke of the production pump.

Another and still further object of the present invention is the provision of method and apparatus by which pressure differential, inertia, and friction are employed in a downhole pump to contact and upset and ball of the traveling valve assembly each downstroke of the pump.

An additional object of this invention is the provision of an improved downhole pump gas release device which forms part of the traveling valve assembly and includes a resilient extension arranged along the longitudinal axis of the pump which is brought into contact with the ball of the traveling valve assembly each cycle of operation, and thereby avoids gas locking.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in this disclosure.

DETAILED DESCRIPTION OF THE PREFERRED EMBODIMENT

Figure 1:
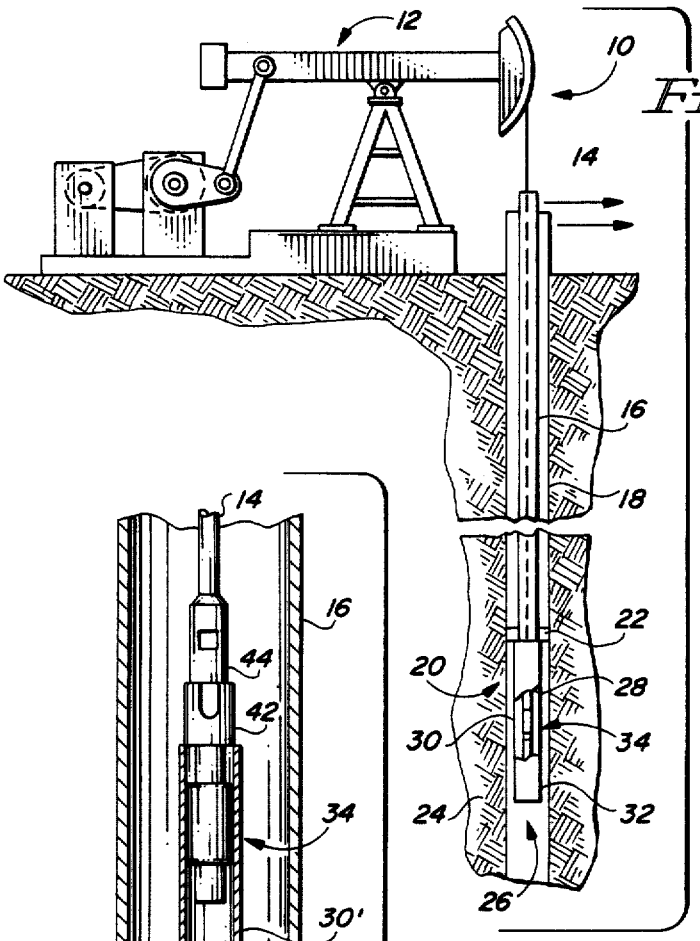
FIG. 1 is a part diagrammatical, part schematical, representation of a cross-section of the earth, illustrating a prior art downhole production pump actuated by a pumpjack unit, with apparatus made in accordance with the present invention being associated therewith.
Figure 3:
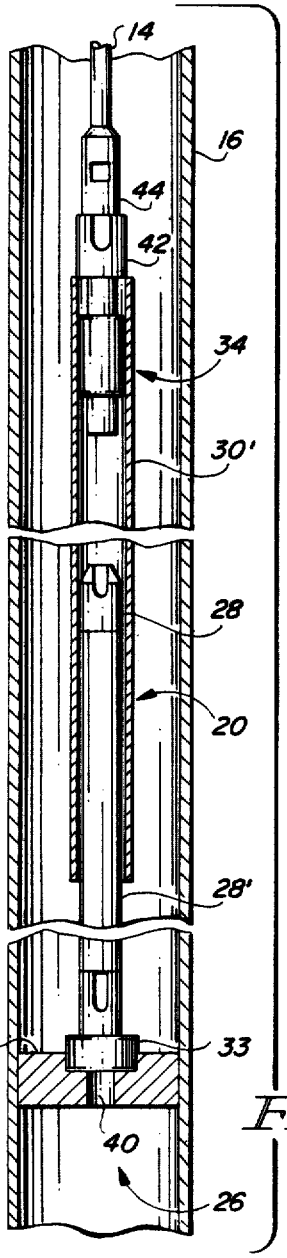
FIG. 3 is an alternant embodiment of the apparatus disclosed in FIG. 2.

In FIG. 1 of the drawings, there is diagrammatically illustrated a prior art oil well production unit 10 which can take on many different forms, and with which the present invention can advantageously be used in combination therewith. The apparatus 10 includes a prior art pumpjack unit 12 which reciprocates a rod string 14.

The rod string 14 extends down through the illustrated production tubing string 16, and the production tubing string 16 extends down through a cased borehole 18. A downhole oil well production pump 20, which can be of several different configurations, is supported within the tubing and the tubing is supported from the casing 18 by any suitable apparatus 22. The apparatus 22 can be a packer, a hanger, or other suitable support means known to those skilled in the art.

Numeral 24 broadly illustrates the payzone or production formation from which production fluid flows at 26 into the suction of the downhole pump 28, whereupon the downhole pump 20 produces the fluid by forcing the fluid to flow up the tubing string 16 and to the illustrated wellhead. A gas relief device 34, made in accordance with the present invention, is incorporated into the downhole pump 20, as will be more fully discussed hereinafter.

Figure 2:
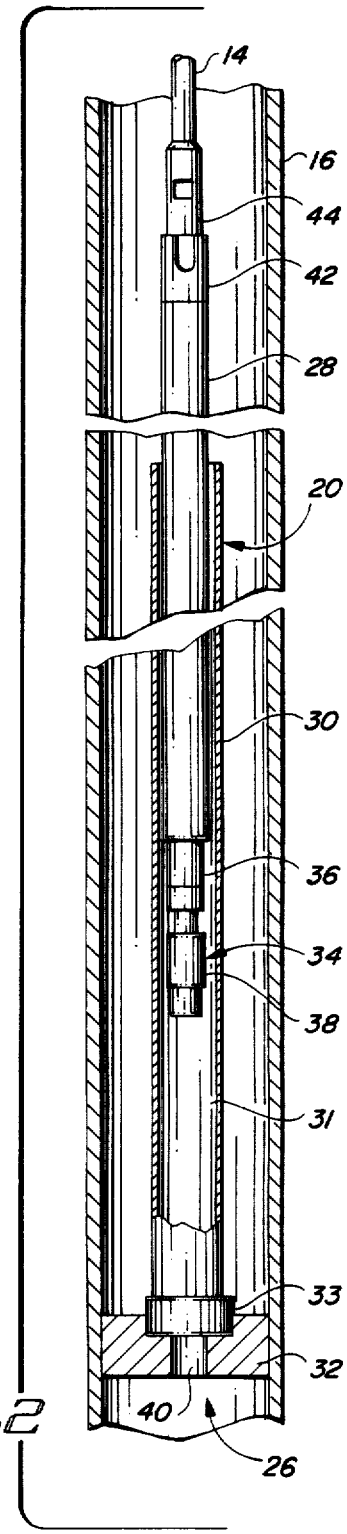
FIG. 2 is an enlarged, fragmentary, part cross-sectional, representation of part of the apparatus disclosed in FIG. 1.

In FIG. 2, the production pump 20 is seen to be of the type having a pump barrel 30 of the stationary type. The pump barrel 30 forms a working chamber 31. The barrel 30 is mounted to tubing 16 by support means 32. The support means 32 can take on any number of forms and is well known to those skilled in the art. A standing valve, schematically illustrated at 33, is located at the lower end of the barrel 30. A gas relief device 34 of the present invention is affixed to the lower end of the plunger 28 by means of the lower end of a traveling valve assembly 36. Accordingly, the gas relief device 34 of the present invention is fixed to the traveling valve assembly and arranged in axial aligned relationship respective to the pump barrel and plunger.

Figure 4:
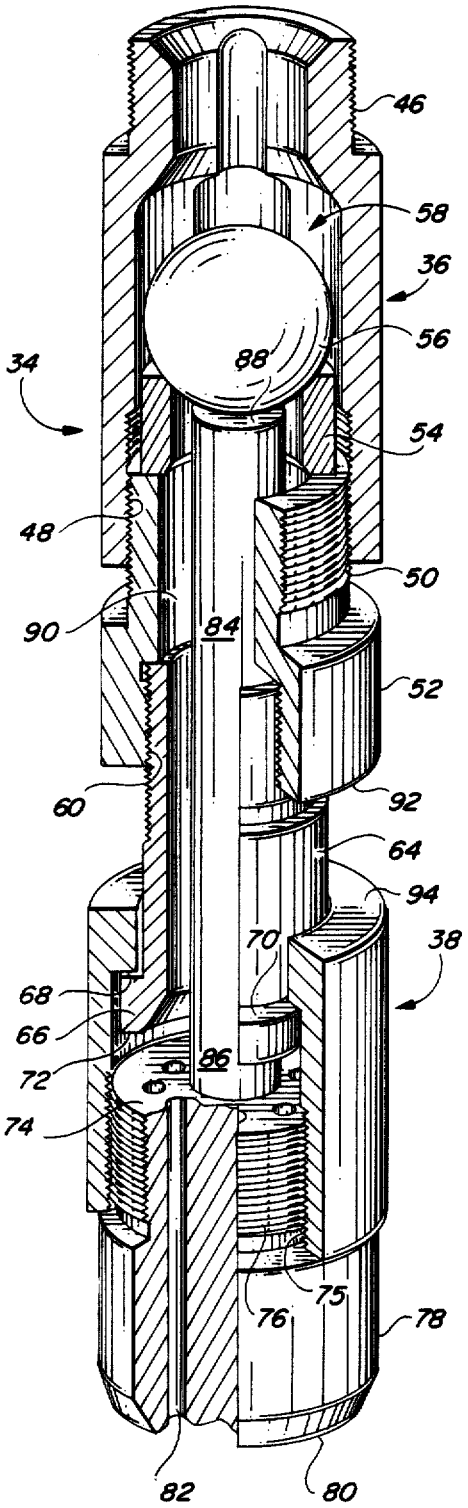
FIG. 4 is an enlarged, longitudinal, part cross-sectional view of part of the apparatus disclosed in FIGS. 1-3, with some parts being removed therefrom, and other parts being shown so as to enhance this disclosure; and, FIG. 5 is an exploded view of the apparatus of the invention set forth in FIG. 4.
Figure 5:
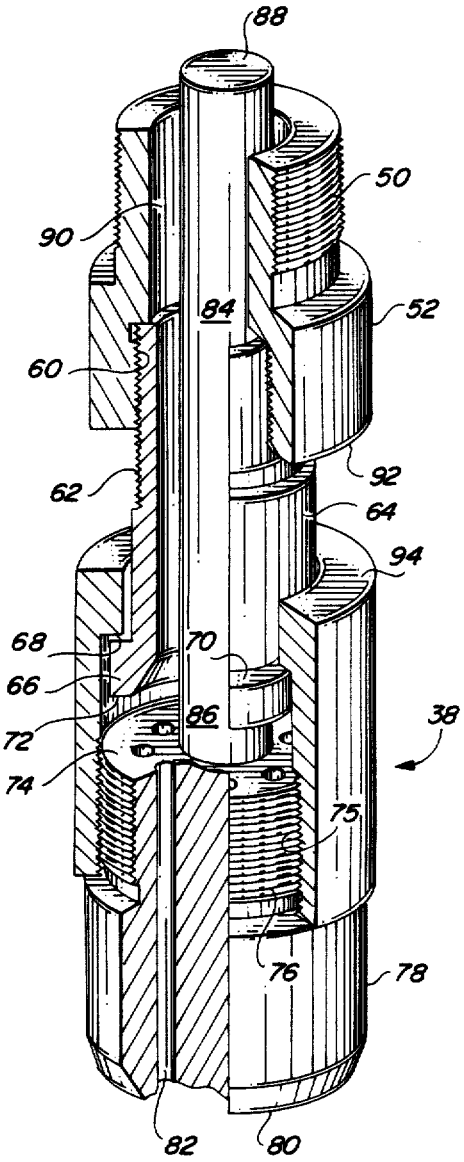

In FIGS. 2 and 4 of the drawings, there is disclosed a prior art traveling valve cage assembly 326, which can take on a number of different forms, and which allows the equalizer or gas release device of the present invention to be suitably connected to the downhole pump. The cage is attached to either a traveling plunger or a traveling barrel as shown in the figures of the drawings. In any instance, the equalizer is attached to the lower end of the traveling valve of the pump as seen illustrated in the drawings.

The equalizer 34 includes a piston 38 which reciprocates respective to the traveling valve assembly 36. The pump suction 40 is connected to the variable pump chamber 31 by means of the standing valve assembly 33. Hence, stroking the pump causes formation fluid at 26 to flow into suction 40, through the standing valve assembly 33, and into the pump variable chamber 31. Numeral 42 indicates the produced fluid outlet, while numeral 44 indicates the box end of the sucker rod string.

In FIG. 4, numeral 46 indicates the upper threaded end of the traveling valve cage 36. The opposed lower end is threaded at 48, and receives the upper threaded end 50 of an adaptor sub 52. The adaptor sub 52 enables the present invention to be attached to any valve cage 36. Numeral 54 indicates a seat against which the bal 56 of the check valve 36 is seated in sealed relationship therewith. The ball is captured within the interior 58 of the valve cage 36.

The equalizer 34 of the present invention is threadedly received at 60 by the adaptor 52. Hollow fixed body 64 has an enlargement 66 formed at the lower marginal end thereof. The piston 38 has an internal circumferentially extending shoulder formed at 68 against which shoulder 70 of the enlargement 66 abuttingly engages. The terminal end of the enlargement forms a shoulder 72 which is opposed to shoulder 70 and abuttingly engages the face 74 of port sub 78. The upper marginal end of the port sub 78 is threaded at 76 and threadedly engages the piston 38 as illustrated at 75.

Lower face 80 of port sub 78 has a plurality of circumferentially arranged ports 82 formed therein. The ports 82 are a series of radially spaced, longitudinally extending passageways which circumferentially extend about the axial centerline of the piston, and in aligned relationship respective to a pushrod 84. The pushrod 84 has one end affixed to the central longitudinal axis of the port sub 78. The upper terminal end 88 of pushrod 84 engages and lifts ball 56 from seat 54 when piston 38 has reciprocated to its uppermost limits during the downstroke of the plunger or barrel. The terminal end 88 is positioned at a location approximately 1/16th inch below the ball 56 when the piston is reciprocated to its lowermost position respective to the traveling valve cage 36 during the upstroke of the plunger or barrel.

The variable pump chamber 31 receives formation fluid which flows through suction 40, through the standing valve 33, and into the variable chamber 31. As the pump is reciprocated by the pumpjack, fluid is sucked into the variable pump chamber 31 on the upstroke and is forced through the traveling valve 36 on the downstroke so that fluid flows into the annulus between the downhole pump and the tubing string 16.

Accordingly, fluid must flow into the passageways 82 of the equalizer, into the annulus 90 formed between the pushrod 84 and the hollow main body 64, through the valve seat 54, about the ball 56 which must be lifted from the seat at this time, through the valve cage 36, and into the before mentioned production tubing.

Accordingly, it is necessary that the piston 38 be reciprocated in response to reciprocal motion induced into the the pump assembly as the pump upstrokes and downstrokes. As the pump downstrokes, the piston 38 moves uphole respective to the valve cage 36. This movement is effected by inertia, pressure differential across the port sub 78 due to fluid flowing through passageways 82, and friction between the outer surface of the piston and the inner surface of the pump barrel. This action moves the piston of the equalizer assembly uphole respective to the traveling valve at the beginning of the downstroke so that any compressible fluid that may accumulate within the variable pump chamber 31 is exhausted from the variable chamber as soon as it accumulates therein, thereby avoiding gas lock or fluid pounding until the well has pumped off.

In the absence of the present invention, it is possible for some walls to become gas locked prior to a pump-off condition being encountered. Such a condition is possible due to accumulation of compressible fluid within the variable chamber 31 of the downhole pump. Once a pump has become gas locked, it is sometimes necessary for an expert to remedy the situation or otherwise, the pump cannot produce fluid.

I claim:

1. A gas release device for use in conjunction with a downhole pump of the reciprocatory type that includes a traveling valve assembly having a ball type valve element; said gas release device includes only an adaptor means; a cylindrical main body; a piston assembly; and, a pushrod;

said adaptor means enables said main body to be attached directly to the traveling valve assembly of the pump, a passageway formed through said main body and along the central longitudinal axis of the pump, said pushrod has a free end which extends into said passageway for engaging the ball of the traveling valve assembly, and an opposed end is directly and rigidly attached to and forms part of said piston assembly; said main body has an upper end opposed to an enlarged lower end formed thereon *A Port Sub*;

said piston assembly has an upper cylindrical skirt member which is rigidly attached to said port sub; passageways formed through said port sub through which production fluid flows each downstroke of the pump and thereby reciprocates the piston assembly towards the traveling valve; opposed faces formed by an inwardly directed boss of the cylindrical skirt member and the lower enlarged end of said main body abuttingly engage during each upstroke;

whereby; the free end of said pushrod lifts the ball of the traveling valve each downstroke of the well pump.

2. The gas release device of claim 1 wherein said downhole pump has a traveling plunger and a seat that receives the ball, said traveling valve is mounted on said traveling plunger at a location whereby said ball thereof is lifted from the seat thereof by the free end of the pushrod during each downstroke of the pump.

3. The gas release device of claim 1 wherein said downhole pump includes a traveling barrel; said traveling valve includes a seat against which the ball is received, said traveling valve is mounted on said traveling barrel at a location whereby said ball thereof is lifted from the seat thereof by the free end of said pushrod during each downstroke of the pump.

4. The gas release device of claim 1 wherein the downhole pump has a traveling plunger, and means forming a valve cage which is connected to provide said traveling valve assembly and to provide a mount means for receiving the upper end of said main body of said gas release device.

5. In a well pump for use in a wellbore, said pump having a pump plunger mounted for reciprocating motion respective to a cylindrical pump barrel, means imparting reciprocatory motion between said plunger and barrel, there being a variable chamber formed between the plunger and barrel for producing fluid therethrough;

a traveling valve assembly having a caged ball element received against a seat located therein for controlling fluid flow from the variable chamber; and, a stationary valve assembly which is fixed respective to the wellbore for controlling flow into the variable chamber;

said stationary valve is operative on the downstroke to trap fluid in the variable chamber of the pump and said traveling valve is operative on the upstroke to lift fluid towards the surface; the combination with said traveling valve of a gas equalizing device;

said gas equalizing device includes a cylindrical housing having an upper end attached to the lower end of the traveling valve assembly, and a lower end spaced from said upper end, said cylindrical housing has an axial bore which extends longitudinally therethrough; an enlargement formed on the lower marginal end of said cylindrical housing; circumferentially extending opposed shoulders formed on said enlargement;

a piston having a cavity formed at an upper end thereof, confronting circumferentially extending faces formed within said cavity, and arranged for abuttingly engaging the opposed shoulders of said enlargement of said cylindrical housing; whereby said piston is loosely attached to said cylindrical housing and arranged to reciprocate longitudinally respective thereto between the limits provided by said confronting faces and said shoulders, a passageway formed longitudinally through said piston and into said cylindrical housing through which produced fluid can flow;

a pushrod having an upper marginal end portion telescopingly received within the axial bore of the cylindrical housing and a lower end portion rigidly attached to said piston; said piston reciprocates towards and away from the traveling valve on the downstroke and the upstroke; said upper end portion of said pushrod has a terminal end which engages and lifts the traveling ball element from its seat on the downstroke and which is moved free of the traveling ball on the upstroke;

whereby; said pushrod has a free end that lifts the ball of the traveling valve each downstroke of the well pump so that any compressible fluid accumulated within the variable chamber is free to flow from the variable chamber thereof.

6. The combination of claim 5 wherein said well pump has a traveling plunger, said traveling valve is mounted on said traveling plunger at a location whereby said ball thereof is lifted from the seat thereof during each downstroke of the pump in the aforesaid manner.

7. The combination of claim 6 wherein said equalizer device includes an adaptor by which the traveling valve cage provides a mount means by which said equalizer device can be attached thereto.

8. The combination of claim 5 wherein said well pump includes a traveling barrel; said traveling valve is mounted on said traveling barrel at a location whereby said ball thereof is lifted from the seat thereof during each downstroke of the pump in the before described manner.

9. The combination of claim 8 wherein said equalizer device includes an adaptor means connected to the traveling valve assembly which provides a mount means for said device.

10. In an oil well having an artificial lift apparatus that includes a downhole pump of the reciprocating type for lifting fluid to the surface of the ground, said pump having a plunger, a barrel, a variable chamber formed by the plunger and barrel; said plunger being received within said barrel, means imparting reciprocating motion between the plunger and barrel, a standing valve and a traveling valve having a ball and seat for controlling fluid flow through the variable chamber of the pump, the traveling valve includes a valve cage, the combination with said pump of a gas release device;

an adaptor connected to the traveling valve cage at the lower end thereof by which said gas release device is mounted to said traveling valve cage; said gas release device has a cylindrical body having one end affixed to said adaptor and an opposed end which extends towards the standing valve; a piston loosely captured by said opposed end of said cylindrical body to thereby mount the piston for limited reciprocating movement respective to said cylindrical body;

a passageway formed through said piston and cylindrical body, and along the central longitudinal axis of the pump barrel through which produced fluid can flow, a pushrod having a free end extending axially along the longitudinal axis of said cylindrical body for engaging the ball of the traveling valve and a fixed end which is attached to said piston whereby said pushrod is reciprocatingly received in a captured manner within said cylindrical body;

stop means within said piston for limiting the reciprocatory motion of the piston respective to the cylindrical body;

said gas release device has only said piston, said cylindrical body, and said pushrod; said piston comprises only a skirt member and a port sub rigidly attached thereto, said port sub having an upper face which forms one said stop means, a second stop means is formed by the upper end of said skirt member; said skirt member has an inwardly directed boss from which a circumferentially extending downwardly directed cylindrical skirt extends, said passageway is formed through said port sub for flow of production fluid directly therethrough and to the traveling valve; said cylindrical body has an outwardly directed enlargement formed at the lower end thereof which is received within the upper end of said piston;

whereby; said piston moves the end of said pushrod into engagement with the ball to thereby lift the ball of the traveling valve each downstroke of the well pump.

11. The combination of claim 10 wherein said traveling valve is mounted respective to said traveling plunger and to said pushrod whereby said ball of said traveling valve is lifted from the seat thereof during each downstroke of the pump, and the end of said pushrod is spaced from said ball of said traveling valve on each upstroke of the plunger.

12. The combination of claim 10 wherein said gas release device is directly attached to said valve cage by said adaptor; said cylindrical body is directly attached to said adaptor.

*13. A gas release device for use in conjunction with a reciprocating well pump that includes a traveling valve assembly having a ball valve, said gas release device comprising:*

*a body member having a passageway formed therethrough and along the central longitudinal axis of the pump, said body member having an upper end and an opposed, enlarged lower end;*

*adaptor means for attaching said body member to said traveling valve assembly for reciprocal movement therewith; and*

*a piston assembly comprising*

*an upper cylindrical skirt member extending around said body member and having an inwardly directed boss;*

*a port sub rigidly attached to said skirt member, said port sub having flow passages formed therethrough for receiving fluid from said well and;*

*a pushrod extending from said port sub and having a free end which extends into said passagerway;*

*whereby on upward movement of said traveling valve assembly and said body member, said enlarged end of said body member engages said boss to move said skirt and said port sub upwardly, and on downward movement of said traveling valve and said body member, said traveling valve assembly and said body member move relative to said piston assembly so that said pushrod engages said ball valve to unseat same.*

*14. The gas release device of claim 13 wherein said pump includes a traveling plunger, said traveling valve assembly being mounted on said traveling plunger and having a seat that receives said ball valve at a location whereby said ball valve is lifted from its seat by the free end of said pushrod during each downstroke of said pump.*

*15. The gas release device of claim 13 wherein said pump includes a traveling barrel, said traveling valve assembly being mounted on said traveling barrel and having a seat that receives said ball valve at a location whereby said ball valve is lifted from its seat by the free end of said pushrod during each downstroke of said pump.*

*16. In a well pump for use in a wellbore, said pump having a pump plunger and a barrel adapted for relative reciprocal movement to define a variable chamber for receiving fluid, a stationary valve assembly which is fixed respective to the wellbore for controlling flow into the chamber a traveling valve assembly having a ball valve for controlling fluid flow from the chamber, the stationary valve assembly being operative on the upstroke of the plunger to permit fluid to enter the chamber and on the downstroke of the plunger to trap fluid in the chamber, the traveling valve being operative on the upstroke of the plunger to retain fluid in the chamber and on the downstroke of the plunger to permit noncompressible fluid to exit the chamber and enter the barrel; wherein the improvement comprises:*

*a body member having an upper end attached to the lower end of said traveling valve assembly, a lower end spaced from said upper end, an axial bore, and an enlargement formed on said lower end and having circumferentially extending opposed shoulders;*

*a piston having confronting faces defining a cavity and arranged for abuttingly engaging said opposoed shoulders of said enlargement of said body member to attach said piston to said body member and permit relative movement of said body member relative to said piston between the limits provided by said faces and said shoulders, and a longitudinal passageway through which produced fluid from said well can flow into said variable chamber; and*

*a pushrod having an upper end portion telescopingly received within the axial bore of the body member and a lower end portion attached to said piston,*

*said body member moving relative to said piston on the downstroke of said plunger so that the upper end of said pushrod lifts said ball valve from its seat so that any compressible fluid accumulated within the variable chamber exits therefrom and into said barrel.*

*17. The improvement of claim 16 further comprising an adaptor for attaching said body member to said traveling valve.*

*18. The improvement of claim 16 wherein said plunger moves relative to said barrel, said traveling valve being mounted on said plunger at a location whereby said ball valve is lifted from said seat during each downstroke of the pump.*

*19. The improvement of claim 16 wherein said barrel moves relative to said plunger, said traveling valve being mounted on said barrel at a location whereby said ball valve is lifted from said seat during each downstroke of the pump.*

*20. A gas release device for use in connection with a well pump adapted for reciprocal movement in a vertical direction and having a traveling valve assembly including a ball valve, said gas release device comprising:*

*a body member having a vertically extending through passage;*

*means for connecting said body member to said traveling valve assembly for movement therewith;*

*a port sub defining passage means for receiving fluid in said well;*

*a push rod extending through said passage of said body member in a coaxial relationship thereto and between said port sub and said ball valve in an operative relationship thereto:*

*a cylindrical skirt having an upper end portion extending over said body member in a coaxial telescoping relationship and a lower end portion connected to said port sub; and*

*first and second flanges formed on the outer surface of said body member and the inner surface of said skirt, respectively, said second flange adapted to engage said first flange for retaining said skirt over said body member upon upward movement of said body member relative to said skirt and permitting downward movement of said body member relative to said port sub on the downstroke of said pump so that said push rod unseats said ball valve to permit fluid flow through said traveling valve assembly.*

*21. The gas release device of claim 20 wherein said port sub and said skirt permit said downward movement of said body member relative thereto by inertia and by the fluid pressure differential created by said fluid flowing through said passage means of said port sub.*

*22. The gas release device of claim 20 further comprising cooperating threads formed on the lower end portion of said skirt and said port sub to secure said port sub to said skirt.*

*23. The gas release device of claim 20 wherein one end of said push rod is connected to said port sub and the other end of said push rod is adapted to engage said ball valve upon said downward movement of said body member.*

*24. The gas release device of claim 20 whereby, upon downward movement of said pump, compressible fluid from said well and below said port sub passes, via said passage in said port sub, into and through said body member and said traveling valve assembly.*

*25. A gas release device for use in connection with a well pump adapted for reciprocal movement in a vertical direction and having a traveling valve assembly including a ball valve for controlling the flow of fluid through a flow passage, said gas release device comprising:*

*a body member having a vertically extending through passage;*

*means for connecting said body member to said traveling valve assembly for movement therewith;*

*a port sub defining passage means for receiving fluid in said well, said passage means having a diameter less than the diameter of said flow passage to create a pressure differential across said port sub;*

*a push rod extending through said passage of said body member in a coaxial relation to said body member*

*and between said port sub and said ball valve in an operative relationship thereto; and*

*a cylindrical skirt having an upper end portion extending over said body member in a coaxial telescoping relationship, said port sub being connected to the lower end portion of said skirt;*

*said fluid pressure differential permitting downward movement of said traveling valve assembly relative to said port sub on the downstroke of said pump so that said push rod unseats said ball valve to permit fluid flow through said flow passage.*

*26. The gas release device of claim 25 wherein said push rod is connected to said port sub.*

*27. The gas release device of claim 25 further comprising means for retaining said skirt over said body member upon upward movement of said body member relative to said skirt.*

*28. The gas release device of claim 25 further comprising cooperating threads formed on the lower end portion of said skirt and said port sub to secure said port sub to said skirt.*

*29. The gas release device of claim 25 whereby, upon downward movement of said pump, compressible fluid from said well and below said port sub passes, via said passage means of said port sub, into and through said passage of said body member and into and through said flow passage.*

* * * * *

UNITED STATES PATENT AND TRADEMARK OFFICE

CERTIFICATE OF CORRECTION

PATENT NO. : Re. 33,163

DATED : February 13, 1990

INVENTOR(S) : Raymond D. Madden

It is certified that error appears in the above-identified patent and that said Letters Patent is hereby corrected as shown below:

Claim 1, column 6, rewrite line 17 to read as follows and add the following new lines:

thereon;
a port sub;
said piston assembly has an upper dylindrical skirt

Signed and Sealed this

Twenty-seventh Day of August, 1991

*Attest:*

HARRY F. MANBECK, JR.

*Attesting Officer*

*Commissioner of Patents and Trademarks*